(12) United States Patent
Ren et al.

(10) Patent No.: US 10,694,885 B2
(45) Date of Patent: Jun. 30, 2020

(54) COFFEE MAKER AND COFFEE PREPARATION METHOD

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Lizhong Ren, Foshan (CN); Jian Kuang, Foshan (CN)

( * ) Notice: Subject to any disclaimer, the term of this patent is extended or adjusted under 35 U.S.C. 154(b) by 0 days.

(21) Appl. No.: 15/578,712

(22) PCT Filed: Feb. 21, 2017

(86) PCT No.: PCT/CN2017/074249
§ 371 (c)(1),
(2) Date: Dec. 1, 2017

(87) PCT Pub. No.: WO2018/049789
PCT Pub. Date: Mar. 22, 2018

(65) Prior Publication Data
US 2019/0191915 A1    Jun. 27, 2019

(30) Foreign Application Priority Data

Sep. 14, 2016  (CN) .......................... 2016 1 0826055
Sep. 14, 2016  (CN) .......................... 2016 1 0826055
(Continued)

(51) Int. Cl.
*A47J 31/34* (2006.01)
*A47J 31/42* (2006.01)
(Continued)

(52) U.S. Cl.
CPC ............... *A47J 31/34* (2013.01); *A47J 31/06* (2013.01); *A47J 31/0663* (2013.01);
(Continued)

(58) Field of Classification Search
CPC ...... A47J 31/0684; A47J 31/0657–0663; A47J 31/24; A47J 31/32–34; A47J 31/06;
(Continued)

(56) References Cited

U.S. PATENT DOCUMENTS 3,977,313 A * 8/1976 Bieri .................... A47J 31/0684
99/297
4,143,589 A * 3/1979 Weber ..................... A47J 31/32
99/282
(Continued)

FOREIGN PATENT DOCUMENTS

CN  101181135 A  5/2008
CN  102551538 A  7/2012
(Continued)

OTHER PUBLICATIONS

Translation of CN102551538 (Year: 2012).*
Translation of CN103169377 (Year: 2013).*

*Primary Examiner* — Matthew P Travers
(74) *Attorney, Agent, or Firm* — Kilpatrick Townsend & Stockton, LLP (57) ABSTRACT

A coffee maker and a coffee preparation method thereof are disclosed, the coffee maker includes: a stator frame; a grinding chamber including a cavity is mounted on the stator frame, and a cover; the cavity is covered by the cover to enclose a grinding cavity, a bottom of the grinding cavity having a beverage outlet communicated with the beverage cavity; a grinding device including a grinding knife tackle disposed in the grinding cavity, and a motor disposed outside the grinding cavity to drive the grinding knife tackle to rotate; a coffee strainer, circularly arranged on a peripheral of the grinding knife tackle; a lower end of the coffee strainer abuts a bottom wall of the grinding cavity to
(Continued)

separate the grinding cavity into a grinding bean cavity and a beverage cavity disposed on the periphery of the grinding bean cavity.

32 Claims, 7 Drawing Sheets (30) Foreign Application Priority Data

Sep. 14, 2016 (CN) .......................... 2016 2 1055724
Sep. 14, 2016 (CN) .......................... 2016 2 1058049

(51) Int. Cl.
| | | |
|---|---|---|
| A47J 31/06 | (2006.01) | |
| A47J 31/44 | (2006.01) | |
| A47J 31/40 | (2006.01) | |
| A47J 31/46 | (2006.01) | |
| A47J 31/54 | (2006.01) | |
| A47J 31/48 | (2006.01) | |

(52) U.S. Cl.
CPC ......... *A47J 31/0684* (2013.01); *A47J 31/405* (2013.01); *A47J 31/42* (2013.01); *A47J 31/4403* (2013.01); *A47J 31/446* (2013.01); *A47J 31/4407* (2013.01); *A47J 31/46* (2013.01); *A47J 31/48* (2013.01); *A47J 31/0605* (2013.01); *A47J 31/54* (2013.01)

(58) Field of Classification Search
CPC ............ A47J 31/0605–061; A47J 31/42; A47J 31/4407; A47J 31/446; A47J 31/54–31/542; A47J 31/0573; A47J 31/02; A47J 31/057; A47J 31/10
See application file for complete search history.

(56) References Cited

U.S. PATENT DOCUMENTS

| | | | |
|---|---|---|---|
| 4,865,737 A | | 9/1989 | McMichael |
| 4,962,693 A | * | 10/1990 | Miwa ...................... A47J 31/22 99/283 |
| 2014/0318377 A1 | * | 10/2014 | Chen ...................... A47J 31/461 99/281 |
| 2016/0227956 A1 | * | 8/2016 | Ko .......................... A47J 31/06 |
| 2017/0020327 A1 | * | 1/2017 | Liu ......................... A47J 31/103 |

FOREIGN PATENT DOCUMENTS

| | | |
|---|---|---|
| CN | 103040361 A | 4/2013 |
| CN | 103169377 A | 6/2013 |
| CN | 205548335 U | 9/2016 |
| CN | 206284885 U | 6/2017 |
| CN | 206333753 U | 7/2017 |
| EP | 0367600 A1 | 5/1990 |

* cited by examiner

COFFEE MAKER AND COFFEE PREPARATION METHOD

FIELD OF THE INVENTION

The present application is a national phase entry under 35 USC § 371 of International Application PCT/CN2017/074249, filed Feb. 21, 2017, which claims the benefit of and priority to Chinese Patent Application No. 201610825498.4, 201621058049.3, 201610826055.7 and 201621057724.0, filed Sep. 14, 2016, the entire disclosures of which are incorporated herein by reference.

BACKGROUND OF THE INVENTION

At present, in the ordinary coffee maker, a strainer is provided in the brewing cavity. In a process of brewing coffee, firstly the coffee powders are usually put into the strainer, and then hot water is poured into the strainer to brew the coffee. It is understood that this coffee is brewed at the constant pressure, so that the coffee powders are difficult to be fully infiltrated, resulting in that the brewed coffee is not strong enough.

SUMMARY OF THE INVENTION

The present disclosure relates to a coffee maker, aims to brew coffee in a micro-pressure and obtain a stronger coffee.

To realize the above aims, the present disclosure relates to a coffee maker, including:
 a stator frame;
 a grinding chamber, having a cavity and a cover, the cavity is mounted on the stator frame, the cavity is covered by the cover to form a grinding cavity, a bottom of the grinding cavity is provided with a beverage outlet;
 a grinding device, having a grinding knife tackle that is provided in the grinding cavity, a motor that is provided outside the grinding cavity for driving the grinding knife tackle to rotate;
 a coffee strainer, circularly arranged on a periphery of the grinding knife tackle, and a lower part of the coffee strainer abuts a bottom wall of the grinding cavity, to separate the grinding cavity into a grinding bean cavity and a beverage cavity that is disposed around the periphery of the grinding bean cavity, the beverage outlet is communicated with the beverage cavity;
 a hot water supply device, communicated with the grinding cavity, to supply hot water into the grinding bean cavity; a pressure space is formed in the upper grinding bean cavity after the hot water is injected to reach a preset volume.

In one embodiment, an upper part of the coffee strainer is sealed with the cavity, and the cavity is sealed with the cover.

In one embodiment, a first seal ring is provided between the upper part of the coffee strainer and an upper part of the cavity.

In one embodiment, a locating groove with a ring shape is provided on an outer surface of the upper part of the coffee strainer, to sleeve the first seal ring on the locating groove; and the first seal ring is partially extruded out of the locating groove and elastically abuts an inner surface of the upper of the cavity.

In one embodiment, a second seal ring is provided between an inner end-surface of the cover and an upper end-surface of the cavity.

In one embodiment, the upper part of the coffee strainer is sealed with the cover.

In one embodiment, the upper part of the coffee strainer is radially sealed with the cover by using the first seal ring.

In one embodiment, the cover is provided with a column-shaped protrusion that protrudes into the upper of the coffee strainer, the first seal ring is provided between an outer surface of the protrusion and an inner surface of the coffee strainer.

In one embodiment, the first sealing ring includes an annular-shaped sealing body extends along an axial direction of the grinding cavity, and an outer surface of the sealing body is provided with at least one annular-shape sealing bulge rib; the sealing bulge ribs is elastically abutting the inner surface of the upper of the coffee strainer.

In one embodiment, the upper part of the sealing body is provided with a limiting flange that extends outward along a radial direction of the grinding chamber; and the upper surface of the coffee strainer abuts the limiting flange.

In one embodiment, a second seal ring is provided between the upper part of the coffee strainer and the upper part of the cavity.

In one embodiment, the locating groove with a ring shape is provided on an outer surface of the upper part of the coffee strainer, let a first seal ring being sleeved on; and the first seal ring is partially extruded out of the locating groove and elastically abuts an inner surface of the upper of the cavity.

In one embodiment, a seal washer is provided between the inner end-surface of the cover and the upper end-surface of the cavity.

In one embodiment, the upper part of the cavity is provided with an annular-shaped step to lap the inner end-face of the cap body, the upper end-surface of the coffee strainer is situated higher than or flush the annular-shaped step, the seal washer is disposed between the annular-shaped step and the inner surface of the cap body.

In one embodiment, the coffee strainer is an all-metal strainer.

In one embodiment, the filtration holes of the all-metal strainer are provided in the middle part and/or the lower part of the all-metal strainer.

In one embodiment, the coffee strainer includes a strainer body, circularly arranged on the peripheral of the grinding knife tackle; and a cylindrical fixed frame, a lower end of the fixed frame is fixedly connected with an upper end of the strainer body along the axial direction; the lower end of the strainer body is a lower end of the coffee strainer, an upper part of the fixed frame is the upper part of the coffee strainer.

In one embodiment, a material of strainer body is metal, the material of the fixed frame is plastic, and the fixed frame is fixed to the strainer body by injection molding.

In one embodiment, a bottom wall of the cavity is provided with a lug boss, the strainer body is sleeved on the lug boss, to position the strainer body in the grinding cavity.

In one embodiment, the coffee strainer includes a first strainer body, circularly arranged on the peripheral of the grinding knife tackle; and at least one second strainer body, arranged on a lower peripheral of the first strainer body; each of the lower end of the first strainer body and the lower end of the second strainer body abuts the bottom wall of the grinding cavity; the first strainer body and the second strainer body enclose a second filter chamber that is located between the grinding bean cavity and the beverage cavity.

In one embodiment, the hot water supply device includes a water tank, a water supply pipe is connected with the water tank and the grinding chamber, a water pump and a heating pipe are provided on the water supply pipe.

In one embodiment, the hot water supply device includes a boiler; a water supply pipe is connected with the boiler and the grinding chamber, and the water pump that is provided on the water supply pipe.

In one embodiment, a temperature sensor is disposed in the boiler.

In one embodiment, the boiler and the cavity are situated abreast.

In one embodiment, the cover is provided with a first water inlet, the hot water supply device is communicated with the grinding cavity by using the first water inlet.

In one embodiment, the first water inlet is provided on the lower end-surface of the cover, an opening end of the cavity is provided with the annular-shaped step, radially extending outward, the annular-shaped step is provided with a second water inlet that is communicated with the hot water supply device and the first water inlet.

In one embodiment, the beverage outlet is provided with a liquid outlet valve.

In one embodiment, the liquid outlet valve includes a valve body, and an upper part of the valve body is provided with a sealing strip, and the lower part of the valve body is provided with an annular-shaped lug boss, and an elastomeric member is provided between the annular-shaped lug boss and the lower end-surface of the beverage outlet.

In one embodiment, the cavity is detachably connected with the stator frame.

In one embodiment, an air pressure in the pressure space is greater than or equal to 1 bar, and less than or equal to 2 bar.

In one embodiment, the air pressure in the pressure space is in a range of 1.3 bar to 1.7 bar.

In addition, to realize the above aims, the present disclosure also relates to a coffee preparation method, the coffee maker that is adopted in the coffee preparation method includes: a stator frame; a grinding chamber, including a cavity and a cover, the cavity is mounted on the stator frame, the cavity is covered by the cover to form a grinding cavity, a bottom of the grinding cavity is provided with a beverage outlet; a grinding device, including a grinding knife tackle that is provided in the grinding cavity, a motor that is provided outside the grinding cavity for driving the grinding knife tackle to rotate; a coffee strainer, circularly arranged on a periphery of the grinding knife tackle, and a lower part of the coffee strainer abuts a bottom wall of the grinding cavity, to separate the grinding cavity into a grinding bean cavity and a beverage cavity that is disposed around the periphery of the grinding bean cavity, the beverage outlet is communicated with the beverage cavity; a hot water supply device, communicated with the grinding cavity, to supply hot water into the grinding bean cavity; a pressure space is formed in the upper grinding bean cavity after the hot water is injected to reach a preset volume.

The coffee preparation method includes following steps.

The grinding knife tackle grinds the coffee beans that are disposed into the grinding bean cavity to coffee powders.

The hot water supply device supplies hot water into the grinding bean cavity, after the hot water is injected to reach the preset volume; the pressure space is formed in the upper grinding bean cavity, to pressure brew coffee liquid in the grinding bean cavity.

In one embodiment, after the step of that the hot water supply device injects the hot water into the grinding bean cavity, also includes the following step.

The hot water supply device injects air into the grinding bean cavity, to increase or maintain the air pressure in the pressure space.

In one embodiment, the air pressure in the pressure space is in a range of 1.3 bar to 1.7 bar.

In the technical solution of the present disclosure, by adjusting a water inlet rate of the hot water supply device, the water inlet rate is set faster than a water outlet rate of the coffee strainer. When the water in the grinding bean cavity is overflow into the filtration holes in the coffee strainer, and then the pressure space is formed in the upper the coffee strainer, which causes brewing the coffee in the micro-pressure, so as to fully infiltrate the coffee powders, and the brewed up coffee is stronger.

BRIEF DESCRIPTION OF THE DRAWINGS

To illustrate the technical solution according to the embodiments of the present disclosure or in the prior art more clearly, the accompanying drawings for describing the embodiments or the prior art are introduced briefly in the following. Apparently, the accompanying drawings in the following description are only about some embodiments of the present disclosure, and those of ordinary skill in the art can derive other drawings from the accompanying drawings without creative efforts.

LABEL DECLARATION OF THE FIGURES

| Label | Name | Label | Name |
|---|---|---|---|
| 1 | Stator frame | 2 | Grinding chamber |
| 20 | Grinding cavity | 21 | Cavity |
| 22 | Cover | 23 | Beverage outlet |
| 201 | Grinding bean cavity | 202 | Beverage cavity |
| 211 | Annular-shaped step | 212 | Second water inlet |
| 221 | First water inlet | 222 | Water outlet |
| 24 | Lug boss | 223 | Protrusion |
| 3 | Grinding device | 31 | Grinding knife tackle |
| 32 | Motor | 4 | Coffee strainer |
| 203 | Second filter chamber | 41 | Strainer body |
| 42 | Fixed frame | 43 | First stiffener |
| 44 | Second stiffener | 411 | First strainer body |
| 412 | Second strainer body | 43a | Stiffener ring |
| 43b | Strengthen rib | 51 | Seal washer |
| 40 | Locating groove | 5 | Hot water supply device |
| 51 | Boiler | 52 | Water supply pipe |
| 53 | Water pump | 6 | First seal ring |
| 61 | Sealing body | 62 | Sealing bulge ribs |
| 63 | Limiting flange | 7 | Second seal ring |
| 8 | Temperature sensor | 9 | Liquid outlet valve |
| 91 | Valve body | 92 | Sealing strip |
| 93 | Elastomeric member | 911 | Annular-shaped lug boss |

Objective achieving, function features, and advantages of the present disclosure are further described with reference to the embodiments and the accompany drawings.

DETAILED DESCRIPTION OF THE EMBODIMENTS

Technical solutions of the present disclosure are further described in detail with reference to the accompanying drawings and embodiments. It is to be understood that the specific embodiments described herein are merely used for describing the present disclosure, but are not intended to limit the present disclosure. Based on embodiments in the present disclosure, all other embodiments obtained by those of ordinary skill in the art without making creative work are within the scope of the present disclosure. It should be noted that the directional terms (such as up, down, left, right, front and rear . . . ). In the embodiments of the present disclosure are merely used to explain the relative positions, the movement situation, etc. of each components in a particular gesture (as shown in the accompanying drawings), and if the particular posture changes, the directional terms also changes accordingly.

In addition, the description of "first", "second" and the like in the present disclosure is used for the purpose of description only, and couldn't construed as indicating or implying its relative importance or implicating the number of the indicated technical features. Thus, the feature that defines "first" "second" may expresses or implicates that it includes at least one of the described features. In addition, the technical solution between various embodiments are combined with each other, but may be based on the realization of those ordinary skill in the art. When the combination of technical solution arises contradictory or cannot be achieved, the combination of such a technical solution may be considered as non-existent, and is not within the scope of the disclosure as claimed.

The present disclosure relates to a coffee maker.

Figure 1:
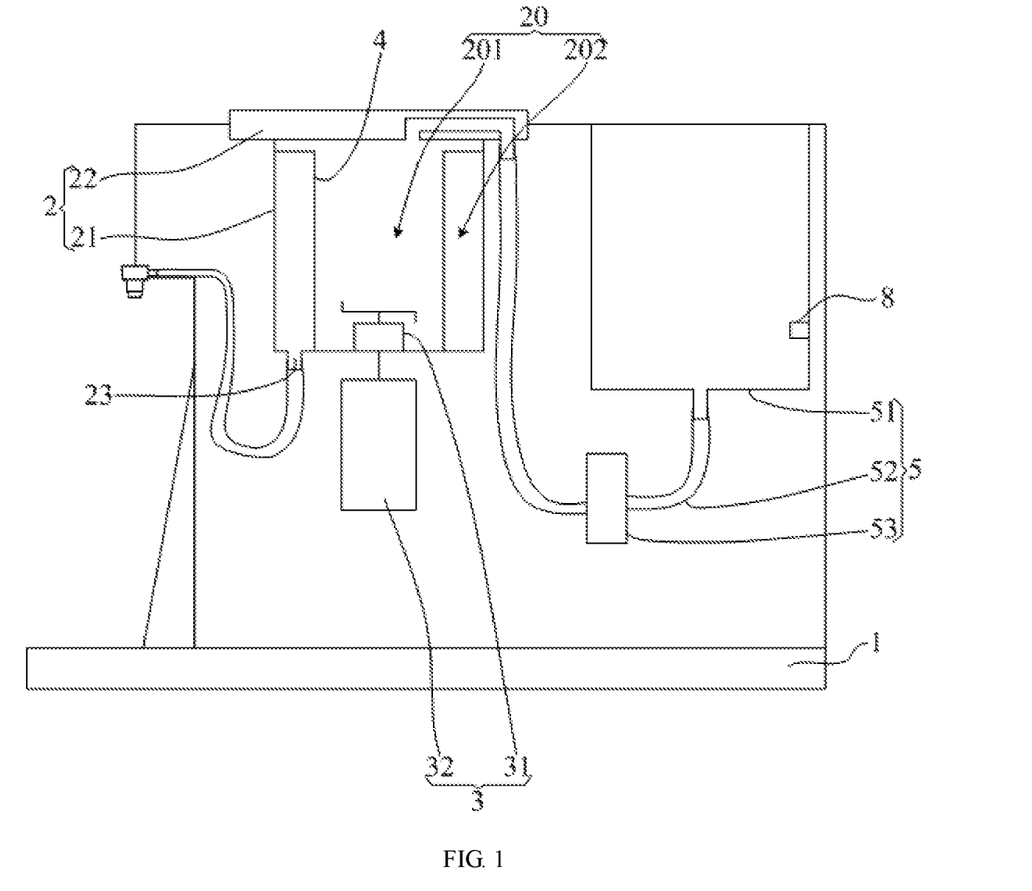
FIG. 1 is a block diagram of the coffee maker according to an embodiment of the present disclosure.

With reference to FIG. 1, in an embodiment of the present disclosure, the coffee maker includes:

a stator frame 1;

a grinding chamber 2, including a cavity 21 and a cover 22, the cavity 21 is mounted on the stator frame 1, the cavity 21 is covered by the cover 22 to form a grinding cavity 20, a bottom of the grinding cavity 20 is provided with a beverage outlet 23;

a grinding device 3, including a grinding knife tackle 31 that is provided in the grinding cavity 20, a motor 32 that is provided outside the grinding cavity 20 for driving the grinding knife tackle 31 to rotate;

a coffee strainer 4, circularly arranged on a periphery of the grinding knife tackle 31, and a lower part of the coffee strainer 4 abuts a bottom wall of the grinding cavity 20, to separate the grinding cavity 20 into a grinding bean cavity 201 and a beverage cavity 202 that is disposed around the periphery of the grinding bean cavity 201, the beverage outlet 23 is communicated with the beverage cavity 202;

a hot water supply device 5, communicated with the grinding cavity 20, to supply hot water into the grinding bean cavity 201, after the hot water is injected to reach a preset volume, a pressure space is formed in the upper grinding bean cavity; and an electronic control device (not shown), is electrically connected to the grinding device 3 and the hot water supply device 5, to control the operation of the grinding device 3 and the hot water supply device 5.

In the present embodiment, the hot water of the preset volume refers to the hot water volume that may drill over filtration holes of the coffee strainer 4; it is understandable that the coffee strainer 4 has a constant throttling action, by using the hot water supply device 5 the hot water is quickly injected to reach the preset volume, after the hot water drilled over the filtration holes of the coffee strainer 4, an outside hot water level of the coffee strainer 4 is lower than an inside water level of the coffee strainer 4, at this point, then continually inject the hot water quickly, and the pressure space can be formed on an upper part of the coffee strainer 4.

In the technical solution of the present embodiment, by adjusting a water inlet rate of the hot water supply device 5, to make the water inlet rate faster than a water outlet rate of the coffee strainer 4. When the water in the grinding bean cavity is drilled over the filtration holes in the coffee strainer 4, then the pressure space is formed in the upper coffee strainer 4, to brew the coffee in a micro-pressure, so as to fully infiltrate coffee powders, and the brewed coffee is stronger. It should be noted that in the present embodiment, after the hot water supply device 5 injects the hot water into the grinding bean cavity 4 and reached the preset volume, the hot water supply device 5 would also injects air to the grinding bean cavity 201, to increase or maintain an air pressure in the pressure space, thereby achieving continuous micro-pressure brewing of coffee liquid.

In the present embodiment, furthermore, the air pressure in the pressure space is greater than or equal to 1 bar, and less than or equal to 2 bar, avoiding an excessive air pressure in the pressure space. And it is understood that the overpressure may rapidly increase the water outlet rate of the coffee strainer 4, affecting an infiltrating time of the coffee powders. In addition, in order to obtain an effective micro-pressure blowing effect, the pressure in the pressure space cannot be too small, so that an air pressure in the pressure space is usually limited to in a range of 1.3 bar to 1.7 bar. It should be noted that for a certain type of the coffee maker, a total area and a number of the filtration holes that is provided on the coffee strainer 4 are definitively, so that the throttling action is definitively, in such case, the inlet water rate for the hot water supply device 5 can be experimentally obtained to make the pressure space has a suitable air pressure.

In the present embodiment, furthermore, the upper part of the coffee strainer 4 is sealed with the cavity 21, and the cavity 21 is sealed with the cover 22, so that the cover 22 can indirectly seal with the upper part of the coffee strainer 4, to realize the seal of the cover 22 with an upper part of the grinding bean cavity 201. While the present disclosure is not limited to, in other embodiments, the upper part of the coffee strainer 4 can be directly sealed with the cover 22, thus realizing the seal of the cover with the upper part of the grinding bean cavity 201.

Figure 2:
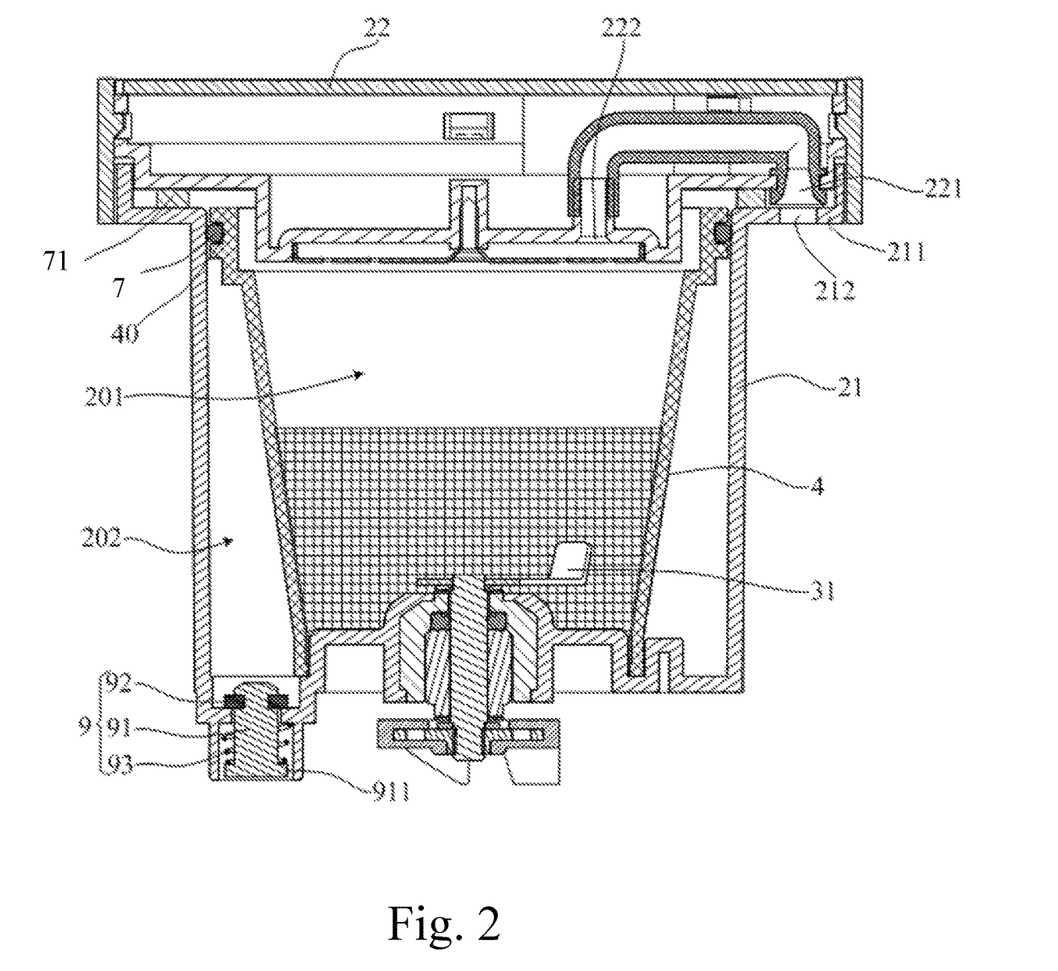
FIG. 2 is a partial schematic diagram of the coffee maker in FIG. 1.

Along with reference to FIG. 2, in the present embodiment, specifically, a second seal ring 7 is provided between the upper part of the coffee strainer 4 and an upper part of the cavity 21, so that by using the second seal ring 7, the upper part of the coffee strainer and the cavity 21 can also by using the second seal ring 7 to realize a sealing connection. While the present disclosure is not limited to, in the other embodiments, the upper part of the coffee strainer 4 and the upper part of the cavity 21 can also by using a helical axial seal to realize the sealing connection. Furthermore, an outer surface of the upper part of the coffee strainer 4 is provided with a locating groove 40, the locating groove 40 is provided to let the second seal ring 7 being sleeved on, to restrict a relative movement between the second seal ring 7, the coffee strainer 4 and cavity 21, so as to prevent a whole of the second seal ring 7 from slipping into the cavity 21, and thereby preventing the seal between the upper part of the coffee strainer and the cavity 21 from invaliding. Without loss of generality, the second seal ring 7 is partially extruded out of the locating groove 40, and elastically against an inner surface of the upper part of the cavity 21.

In addition, in the present embodiment, a third seal ring 7 is provided between an inner end-surface of the cover 22 and an upper end-surface of the cavity 21, so that by using the third seal ring 7, the upper part of the cover 22 is sealed with the cavity 21. Similarly, the present disclosure is not limited to, in the other embodiments, the cover 22 and the cavity 21 can also by using the helical axial seal to realize the sealing connection.

With reference to FIG. 2, in the present embodiment, furthermore, the coffee strainer 4 is an all-metal strainer, that is, the whole of the coffee strainer 4 is made of a metallic material, such as but not limited to, can be manipulated by a die-casting process or a sheet metal process, so the coffee strainer 4 has a more favorable integral stiffness, and can improve a bearing capacity of the coffee strainer 4 against coffee beans and coffee particles. In one embodiment, the coffee strainer 4 is made of a stainless steel material, the stainless steel material has a strong rigidity that is more resistant to an outward impact force of the coffee beans and the coffee particles; of course, in the other embodiments the coffee strainer 4 may also made of but not limited to an aluminum alloy, a titanium alloy and other metal materials. When the coffee strainer 4 is the all-metal strainer, the filtration holes of the all-metal strainer are provided in a middle part and/or the lower part of the all-metal strainer, that is, the upper part of the all-metal strainer skipped the filtration holes, in this way, after the hot water drilled over the middle part of the all-metal strainer, an absolute confined space can be formed between the upper part of the all-metal strainer and the cover body 22, so that the micro-pressure brewing effect of the coffee is better.

However, the present disclosure is not limited to, in the other embodiments, the coffee strainer 4 also includes a strainer body that is circularly arranged on the peripheral of the grinding knife tackle 31 and the fixed frame that is provided in a cylindrical shape, an lower part of the fixed frame is fixedly connected with an upper part of the strainer body, the lower part of the strainer body is the lower part of the coffee strainer 4, an upper part of the fixed frame is the upper part of the coffee strainer 4; and the strainer body is a metal member to ensure the favorable rigidity of the strainer body, a material of the fixed frame is plastic. Thus, the fixed frame 42 can be easily fixed to the strainer body by injection molding, and the injection molding process is a mature processing process, which facilitates the batch processing of the coffee strainer 4; it should be noted that, the filtration holes of the coffee strainer 4 is provided on the strainer body, the fixed frame is used to assist the fixing of the strainer body, the fixed frame is provided with the filtration holes, so that when the hot water is drilled over the strainer body, the absolute confined space can be formed between the cylindrical shaped fixed frame and the cover body 22, so that the brewing effect of the coffee is better.

With reference to FIG. 1, furthermore, the hot water supply device 5 includes a boiler 51, the water supply pipe 52 that is communicated with the boiler 51 and the grinding chamber 2, and a water pump 53 is provided on the water supply pipe 52. In the present embodiment, the boiler 51 is provided with a water storage space that is served to heat the water in the water storage space into hot water, and the water pump 53 injects the hot water into the grinding bean cavity 201 by using the water supply pipe 52. It should be noted that, in the present embodiment, the water pump 53 also has a function of injecting air into the grinding bean cavity 201.

However, the present disclosure is not limited to, in the other embodiments, the water supply pipe 5 may include the water tank, the water supply pipe that is connected with the water tank and the grinding cavity 20, and the water pump and a heating tube that are provided on the water supply pipe, the heating tube heats the water in the water supply pipe into hot water, making the water that is injected to the grinding bean cavity 201 by the water pump to be hot.

In the present embodiment, in order to improve an intelligence of the electronic control device, a temperature sensor 8 is disposed in the boiler 51, and it is understandable that the temperature sensor 8 is electrically connected to the electronic control device so that the electronic control device may obtain a temperature of the water in the boiler 51, when an actual water temperature reaches the preset water temperature, and then the water pump 53 is controlled to inject the hot water of the preset water temperature into the grinding bean cavity 201, so that the coffee is brewed in an appropriate temperature and tastes better. In addition, in the present embodiment, the boiler 51 is situated abreast with the cavity 21 to prevent an overall height of coffee maker from being excessively high.

With reference to FIG. 1 and FIG. 2, in the present embodiment, the cover 22 is provided with a first water inlet 221, and the hot water supply device 5 is communicated with the grinding cavity 20 by using the first water inlet 221. In this way, to properly adjust the position of a water outlet 222 on the cover 22, the hot water can be easily injected into the grinding bean cavity 201. However, the present disclosure is not limited to, in the other embodiments, the hot water supply device 5 may also be directly communicated with the grinding cavity 20 by using the cavity 21, that is, and the water inlet is provided on a side wall of the cavity 21. Furthermore, the first water inlet 221 is provided at a lower end-surface of the cover 22, and an opening end of the cavity 21 is provided with an annular-shaped step 211 that is extended outward radially, and the annular-shaped step 211 is provided with a second water inlet 212 to communicate the hot water supply device 5 with the first water inlet 221. Thus, comparing with the technical solution of directly providing the first water inlet 221 on the side of the cover 22 that is faced the boiler 51, the present technical solution makes it possible to reduce a separation distance between the grinding chamber 2 and the boiler 51, so that the overall structure of the coffee machine is more compact and the volume is smaller.

In the present embodiment, furthermore, the cavity 21 is detachably connected with the stator frame 1, so that when the grinding chamber 2 needs to be cleaned, the grinding chamber 2 can be detached from the stator frame 1, and it is easy to carry out a full range clean to the grinding chamber 2.

With reference to FIG. 2, in the present embodiment, the beverage outlet 23 is provided with a liquid outlet valve 9, after the grinding chamber 2 is detached from the stator frame 1, the liquid outlet valve 9 closes the beverage outlet 23 to avoid coffee residues in the cavity 21 flows from the beverage outlet 23 to a desktop or a ground. Specifically, the liquid outlet valve 9 includes a valve body 91, and the upper part of the valve body 91 is provided with a sealing strip 92, and the lower part of the valve body 91 is provided with an annular-shaped lug boss 911, the lower end-surface of the annular-shaped lug boss 911 and the beverage outlet 23 is provided with an elastomeric member 93. When a lower end of the valve body 91 is subjected to an upward jacking force, the elastomeric member 93 is shortened, making the sealing strip 92 moves up with the valve body 91 and the beverage outlet 23 is opened so that the coffee liquid can flow out of the beverage outlet 23. While the jacking force received by the valve body 91 disappears (for example, the grinding chamber 2 is removed from the stator frame 1, the elastomeric member 93 is elongated so that the valve body 91 is moved down with the sealing strip 92 to close the beverage outlet 23, to avoid the coffee residues flows out of the beverage outlet 23. Without loss of generality, in the present embodiment, the elastomeric member 93 can be a compression spring; definitely, in the other embodiments, the elastomeric member 93 also can be, but not limit to, an elastic sleeve or the like. In addition, it should be noted that, in the other embodiments, the liquid outlet valve 9 also can be a control valve of other structures as long as an opening and a closing of the beverage outlet 23 can be achieved.

Figure 3:
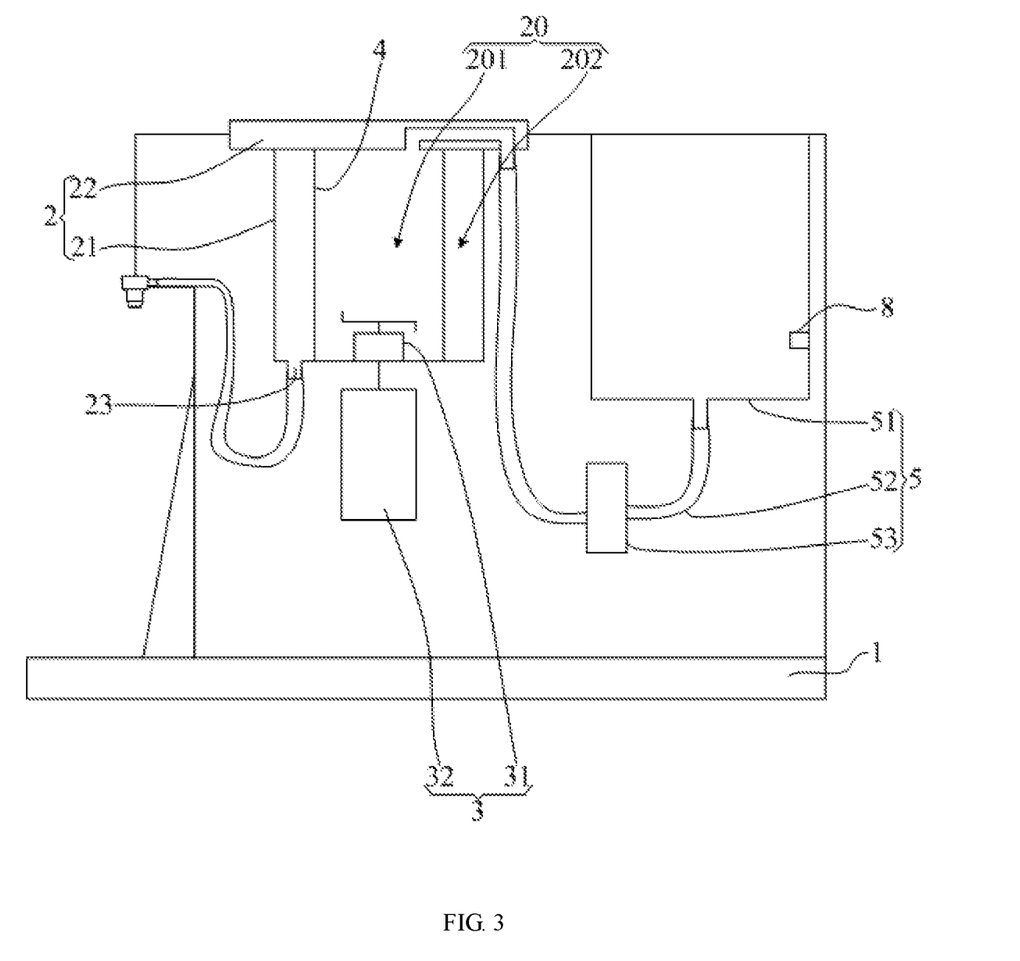
FIG. 3 is a block diagram of the coffee maker according to another embodiment of the present disclosure.

With reference to FIG. 3, FIG. 3 is a structural schematic diagram in another embodiment of the coffee maker of the present disclosure; a difference between the present embodiment and the foregoing embodiment is that, the upper part of the coffee strainer 4 is sealed with the cover 22, by adjusting the water inlet rate of the hot water supply device 5, to make the water inlet rate faster than the water outlet rate of the coffee strainer 4. When the water in the grinding bean cavity is drilled over the filtration holes in the coffee strainer 4, and then the pressure space is formed in the upper part of the coffee strainer 4, to brew the coffee in the micro-pressure, so as to fully infiltrate the coffee powders, so that the brewed coffee is stronger.

Figure 4:
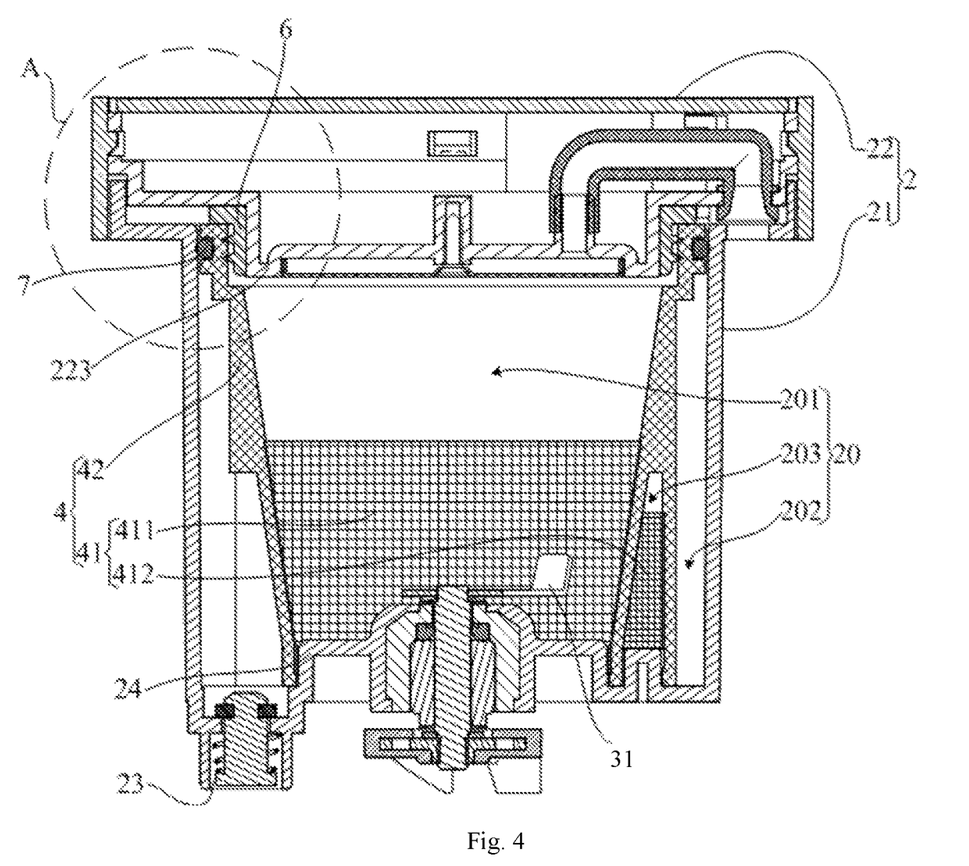
FIG. 4 is a partial block diagram of the coffee maker in FIG. 3.

Along with reference to FIG. 4, in the present embodiment, furthermore, the upper part of the coffee strainer 4 is radially sealed with the cover 22 by using the first seal ring 6. Specifically, the cover 22 is provided with a column-shaped protrusion 223 that protrudes into the upper of the coffee strainer 4, the first seal ring is provided between an outer surface of the protrusion 223 and an inner surface of the coffee strainer 4. So that by using the first seal ring 6, the upper part of the coffee strainer 4 is directly sealed with the cover 22. However, the present disclosure is not limited to, in the other embodiments, the protrusion 223 and the upper part of the coffee strainer 4 can also by using a helical axial seal structure to realize the sealing connection. In addition, in the other embodiments, the inner end-surface of the cover 22 can be provided with a protruded sleeve, and an outer circumference of the upper part of the coffee strainer 4 is sealed with the inner circumference of the sleeve or the inner circumference of the upper part of the coffee strainer 4 is sealed with the outer circumference of the sleeve.

Figure 5:
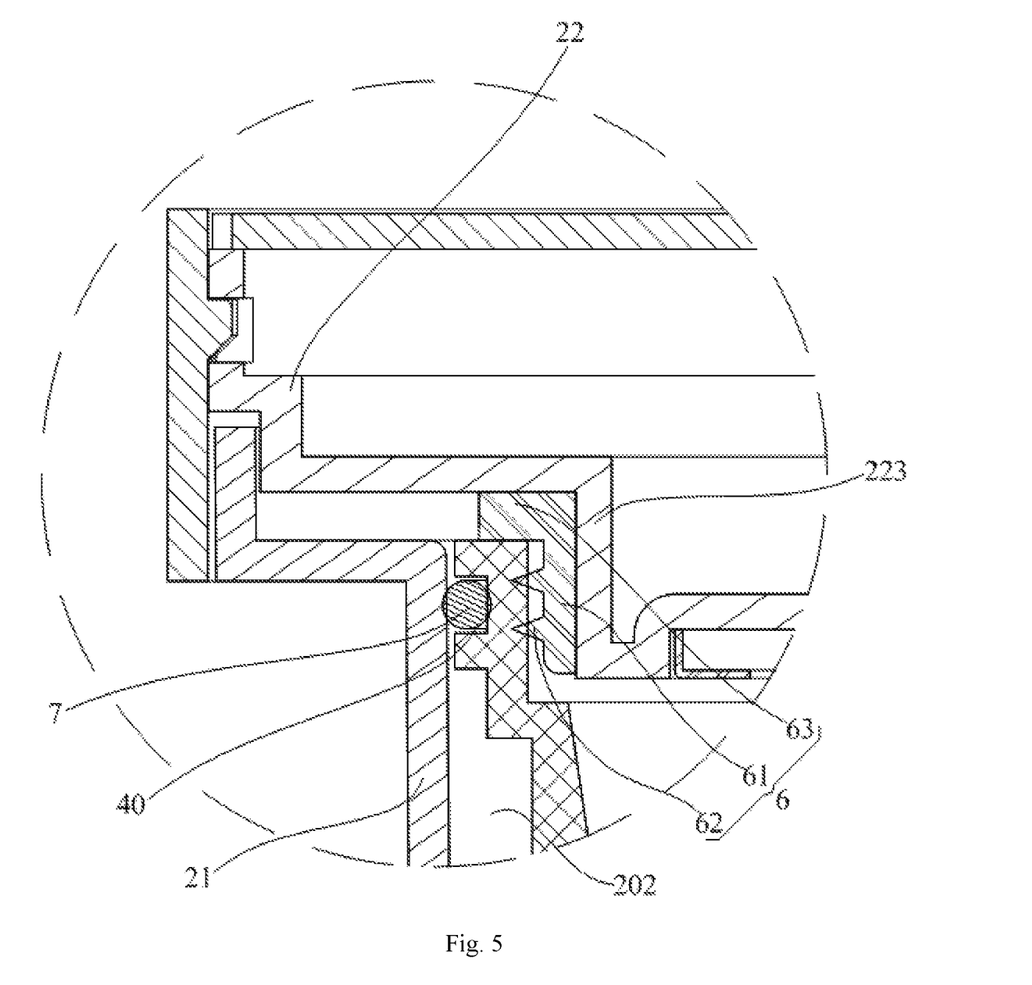
FIG. 5 is a partial enlargement view of a position A in FIG. 4.

Along with reference to FIG. 5, in the present embodiment, specifically, the first seal ring 6 includes a sealing body 61 which is annular-shaped and extending along an axial direction of the grinding cavity, and the inner surface of the sealing body 61 is stuck on the outer circumference of the protrusion and the outer surface of the sealing body 61 is provided with sealing bulge ribs 62 which is in the annular shape and are provided at least one ring, the sealing ribs 62 are elastically against the inner circumference of the upper part of the coffee strainer 4. It is understood that the addition of the sealing bulge ribs 62 can improve the sealing reliability of the first seal ring 6. With reference to FIG. 5, in the present embodiment, the sealing bulge ribs 62 are in parallel and interval set by two rings; definitely, in the other embodiments, the number of turns of the sealing bulge ribs 62 can be, but not limited to, 1, 3 or 4, can be set according to actual needs. In addition, in the present embodiment, the sealing bulge ribs 62 are tapered in a convex direction so that free ends of the sealing bulge ribs 62 are prone to a deformation of which may be beneficial to the protrusion 223 assembles into the upper part of the coffee strainer 4.

In the present embodiment, in order to prevent the whole of the first seal ring 6 from slipping into the coffee strainer 4 and prevent the seal between the upper part of the coffee strainer and the cover 22 from invaliding, the upper part of the sealing body 61 is provided with a limiting flange 63 that is extended along the radial outward direction of the grinding cavity 20, and the upper end-surface of the coffee strainer 4 is conflicted with the limiting flange 63 and then restrict the relative movement between the first seal ring 6 and the coffee strainer 4.

In the present embodiment, furthermore, a second seal ring 7 is provided between the upper part of the coffee strainer 4 and the upper part of the cavity 21 to realize the sealing connection between the upper part of the coffee strainer 4 and the cavity 21; the upper part of the coffee strainer 4 is sealed with the cover 22 so that the grinding cavity 20 is integrally sealed, so that the coffee cannot flow naturally from the beverage outlet 23 after brewing the coffee, and it needs to increase the air pressure of the grinding cavity 20 by using the water pump 53 of the hot water supply device 5 to discharge the coffee from the beverage outlet 23, so as to achieve a pressurized extraction effect of the coffee, thereby improving the quality of the coffee. In the present embodiment, the outer surface of the upper part of the coffee strainer 4 is provided with the locating groove 40, the locating groove 40 is provided to sleeve the first seal ring 7 thereon, to restrict a relative motion between the second seal ring 7, the coffee strainer 4 and cavity 21, so as to prevent the whole of the second seal ring 7 from slipping into the cavity 21, and thereby preventing the seal between the upper part of the coffee strainer and the cavity 21 from invaliding. Without loss of generality, the second seal ring 7 is partially extruded out of the locating groove 40 and elastically abuts the inner surface of the upper of the cavity 21.

With reference to FIG. 4, furthermore, the coffee strainer 4 includes the strainer body 41 that is circularly arranged on a peripheral of the grinding knife tackle 31 and the fixed frame that is arranged in a cylindrical shape, a lower end of the fixed frame 42 is fixedly connected with an upper end of the strainer body 41. In the present embodiment, the lower end of the strainer body 41 is a lower end of the coffee strainer 4, and the upper part of the fixed frame 42 is the upper part of the coffee strainer 4, that is, the lower end of the strainer body 41 abuts the bottom wall of the grinding cavity 20, and the fixed frame 42 is sealed with the cover 22. The locating groove 40 is provided on the outer-surface of the fixed frame 42. It is understood that, the filtration holes of the coffee strainer 4 are provided in the strainer body 41, the fixed frame 42 is used to assist the fixing of the strainer body 41, the fixed frame 42 is skipped the filtration holes, in this way, after the hot water drilled over the strainer body 41, an absolute confined space can be formed between the cylindrical-shaped fixed frame 42 and the cover 22, so that the brewing effect of the coffee is better.

In the present embodiment, specifically, the material of the strainer body 41 is metal, to ensure a good rigidity of the strainer body 41. In one embodiment, the strainer body 41 has good rigidity and can improve the capacity of the strainer body 41 against the outward impact force of the coffee beans and the coffee particles. In one embodiment, the strainer body 41 is made of a stainless steel material, the stainless steel material has a strong rigidity that is more capable of resisting the outward impact force of the coffee beans and the coffee particles; definitely, in the other embodiments the strainer body 41 may also made of but not limited to an aluminum alloy, a titanium alloy and other metal materials and so on. The material of the fixed frame 42 is plastic, thus, the fixed frame 42 can be easily fixed to the strainer body 41 by the injection molding, and the injection molding process is a mature processing process, which facilitates the batch processing of the coffee strainer 4. In addition, the fixing ring 42 is formed by the injection molding process, and the locating groove 40 can be easily formed by simply modifying an injection mold that is used. Definitely, in the other embodiments, the fixed frame 42 can also be fixed to the strainer body 41 by means of bonding or welding.

In addition, in the present embodiment, in order to prevent the strainer body 41 from shaking in the grinding cavity 20 during a working process of coffee maker, the lug boss 24 is provided on the bottom wall of the cavity 21, the lug boss 24 is used for sleeving the strainer body 41 on the lug boss 24, to position the strainer body 41 within the grinding cavity 20.

With reference to FIG. 4, in the present embodiment, furthermore, the coffee strainer 41 includes the first strainer body 411 that is circularly arranged on the peripheral of the grinding knife tackle 21 and at least the second strainer body 412 that is arranged on a lower peripheral of the first strainer body 411, and the lower part of the first strainer body 411 and the lower part of the second strainer body 412 abut the bottom wall of the grinding cavity 20, the first strainer body and the second strainer body enclose a second filter chamber 203 that is located between the grinding bean cavity 201 and the beverage cavity 202. Thus during the process of the grinding knife tackle 31 grinds the coffee beans or stirs the coffee, even though coarser coffee particles push by using the first strainer body 411 and get into the second filter chamber 203 under an action of centrifugal force, the second strainer body 412 can also restricts the coffee particles to stay in the second filter chamber 203, and the coarser coffee particles are effectively avoided to get into the beverage cavity 202, so that a quality of coffee drink is improved. It should be noted that, in the present embodiment, the lug boss 24 is configured to sleeve the first strainer body 411 on it.

In the present embodiment, a mesh range of the first strainer body 411 is in a range of 50 to 120 meshes, in this case, the first filter body 411 has the filtration holes that are in a moderate aperture, and when brewing coffee, most of coffee grounds are confined in the grinding bean cavity 201. Definitely, in the other embodiments, the first strainer body 411 can also has a smaller mesh number to reduce the cost of the coffee strainer 4. In addition, in the present embodiment, the mesh range of the second strainer body 412 is in a range of 80 to 150 meshes, in this case, the filtration holes of the second strainer body 412 have a smaller aperture, on one hand, to avoid the coffee grounds gotten into the beverage cavity 202 from the second filter chamber 203, on the other hand, to reduce a speed of the coffee flowing to the beverage cavity 202, to facilitate a formation of the pressure space. Definitely, in the other embodiments, the second strainer body 412 can also has a larger mesh number to improve restriction effect of the coffee grounds and throttling effect of the coffee strainer 4.

Figure 6:
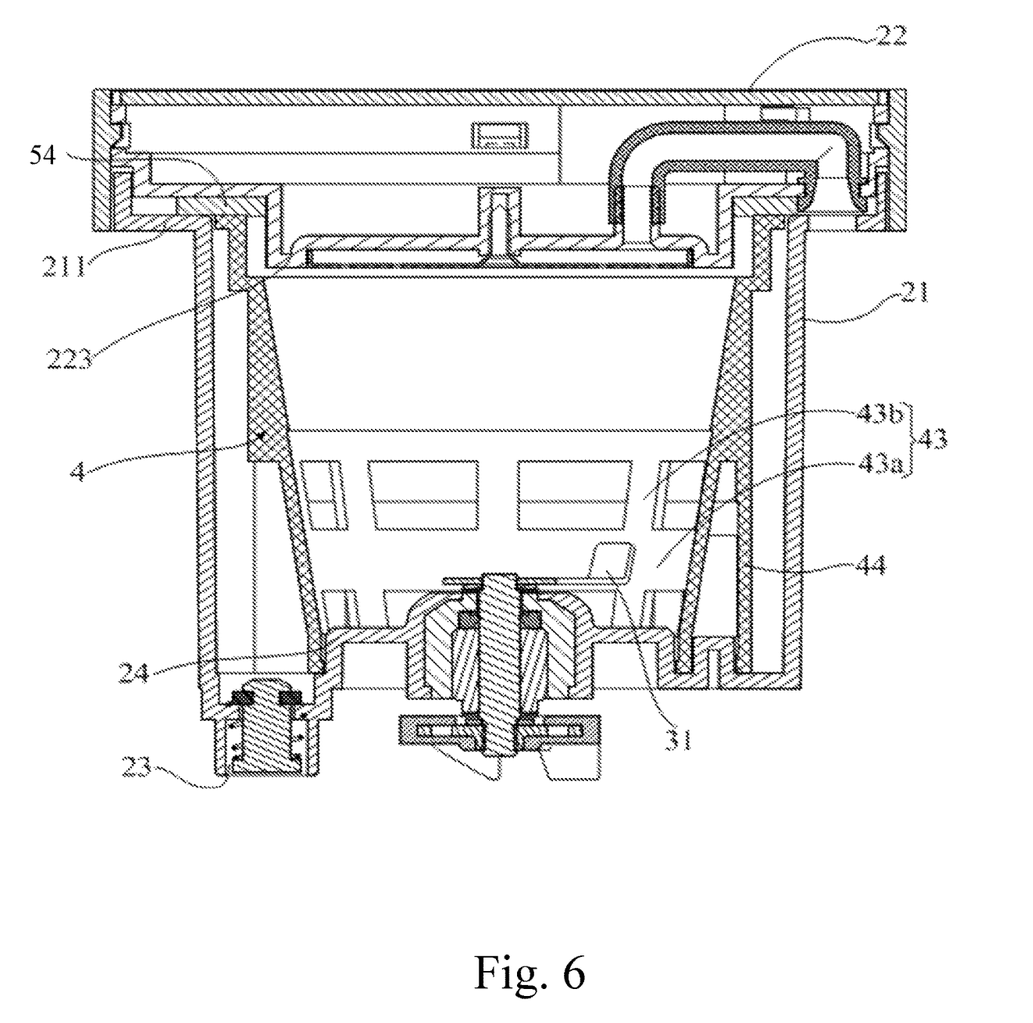
FIG. 6 is a partial block diagram of the coffee maker incorporating a hidden strainer body according to another embodiment of the present disclosure.

With reference to FIG. 6, furthermore, the first strainer body 411 is provided with a first stiffener 43, the first stiffener 43 includes at least a stiffener ring 43a that is provided in the circumferential direction of the first strainer body 411, in this way, the rigidity of the first strainer body 411 in a circumferential direction can be further enhanced, to resist the outward impact force of the coffee beans and the coffee particles, thereby preventing the first strainer body 411 from being deformed, thus prolonging a life of the coffee filter 4. In addition, in order to further improve an integral rigidity of the first strainer body 411, the first stiffener 43 also includes the stiffener ring 43a which is intersected with the strengthen rib 43b; without loss of generality, the strengthen rib 43b can be extended along the axial direction of the first strainer body 411, also can be arranged in an inclined way towards the axial direction of the first strainer body 411. In one embodiment, the upper end of the strengthen rib 43b is fixedly connected to the fixed frame 42, so that the rigidity of the first strainer body 411 is better guaranteed.

Similarly, to enhance the integral rigidity of the second strainer body 412, a second stiffener 44 is also provided on the second strainer body 412. It should be noted that, in the present embodiment, the first stiffener 43 and the second reinforcing rib 44 may be also plastic materials, so that the first stiffener 43 may be easily fixed on the first strainer body 411 by injection molding, the second stiffener 44 may also be easily fixed on the second strainer body 412 by injection molding, thereby facilitating the batch processing of the coffee strainer 4. In one embodiment, the fixed frame 42, the first stiffener 43 and the second stiffener 44 may be made by disposable injection molding, and the process is really convenient.

With reference to FIG. 6, FIG. 6 is a partial block diagram of the coffee maker incorporating a hidden strainer body according to another embodiment of the present disclosure; the difference between another embodiment and the foregoing embodiment is that a seal washer 54 is provided between the inner end-surface of the cover 22 and the upper end-surface of the coffee strainer 4, so that the sealing connection of the upper part of the coffee strainer 4 and the cover 22 is realized by using the seal washer 54, it can be understood that the sealing connection is an axial sealing connection.

Furthermore, the difference among the present embodiment and the foregoing embodiments is that the upper part of the cavity 21 is provided with the annular-shaped step 211 to lap the inner end-face of the periphery of the cover 22, the upper end-surface of the coffee strainer 4 is higher than or flush the annular-shaped step 211, the seal washer 54 is disposed between the edge of the annular-shaped step 211 and the inner surface of the cover 22, thus realizing the sealing connection of the cover 22 and the cavity 21 at the same time, and then realizing the integrally sealing connection of the grinding cavity 20, such that the coffee can't flow naturally from the beverage outlet 23 after brewing the coffee. And it needs to increase the air pressure of the grinding cavity 20 by using the water pump of the hot water supply device to discharge the coffee from the beverage outlet 23, so as to achieve the pressurized extraction effect of the coffee, thereby improving the quality of the coffee.

The present disclosure also relates to a coffee preparation method, the coffee preparation method adopts the coffee maker that is mentioned in foregoing embodiments to prepare the coffee.

Figure 7:
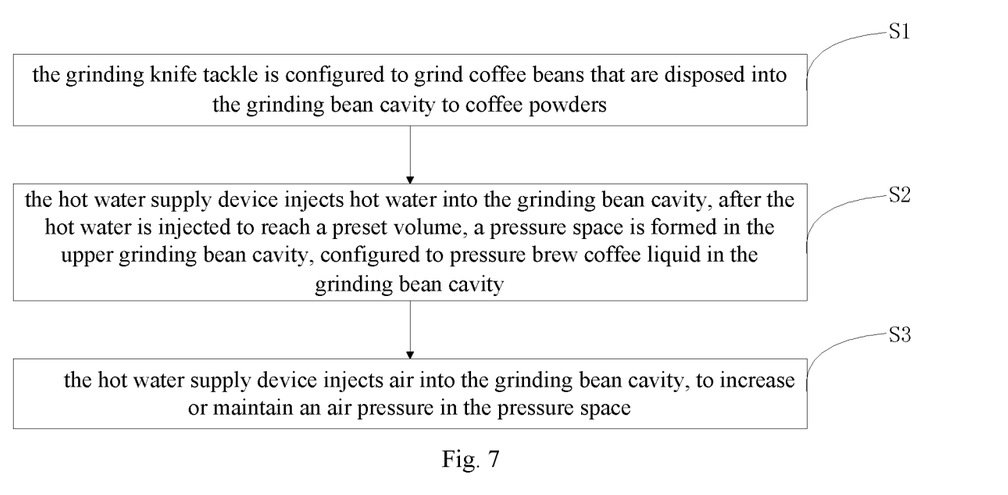
FIG. 7 is a flow chart of the coffee preparation method according to an embodiment of the present disclosure.

With reference to FIG. 7, in the embodiment of the present disclosure, the coffee preparation method includes the following steps.

Step S1, the grinding knife group grinds the coffee beans that are disposed into the grinding bean cavity to coffee powders;

Step S2, the hot water supply device supplies hot water into the grinding bean cavity, after the hot water is injected to reach the preset volume, the pressure space is formed in the upper grinding bean cavity, to pressure brew the coffee in the grinding bean cavity.

In the present embodiment, the grinding knife tackle has the function of grinding the coffee beans and stirring the coffee. After the coffee beans are disposed into the grinding bean cavity, by using a motor to drive the grinding knife tackle to rotate in a high speed, thus coffee beans are ground into coffee powders, it is realized by using the hot water supply device to supply hot water into the grinding bean cavity, to brew coffee. The upper part of the grinding bean cavity is sealed by the cover, during the process of injecting hot water, thus making the water inlet rate faster than the water outlet rate of the coffee strainer, and when the water in the grinding bean cavity is drilled over the filtration holes (preset volume) in the coffee strainer, then the pressure space is formed in the upper coffee strainer, to brew the coffee in the pressure, so as to fully infiltrate the coffee powders, so that the brewed coffee is stronger. It should be noted that during the process of brewing coffee, by using the motor to drive the grinding knife tackle to rotate in a low speed, thus increasing the speed of infiltrating the coffee powders.

In the present embodiment, furthermore, the air pressure in the pressure space is greater than or equal to 1 bar, and less than or equal to 2 bar, to avoid excessive air pressure in the pressure space, and it can be understood that the overpressure would rapidly increase the water outlet rate of the coffee strainer, affecting the infiltrating time of coffee powders. In addition, in order to obtain an effective pressure brewing effect, the air pressure in the pressure space cannot be too small, so that the air pressure range in the pressure space is usually limited to 1.3 bar to 1.7 bar. It should be noted that for a certain type coffee maker, the total area and the number of the filtration holes that are provided on the coffee strainer are definitive thus the throttling action is definitive, in such case, the inlet water rate for the hot water supply device may be experimentally obtained to make the pressure space has a suitable air pressure.

In the present embodiment, furthermore, after the step S2, further includes the following step.

Step S3, the hot water supply device injects the air into the grinding bean cavity, to increase or maintain the air pressure in the pressure space.

It can be understood that the hot water supply device would not supply hot water into the grinding bean cavity without limits, when the volume of the hot water which is injected to the grinding bean cavity by using the hot water supply device reaches the preset volume, the hot water supply device would stop injecting. Hereinafter, in order to prolong the pressure brewing time of coffee maker to the coffee liquid, in the present embodiment, after the hot water supply device stops the water injection, the hot water supply device would continue on injecting air into the grinding bean cavity, to increase or maintain the air pressure in the pressure space, thereby improving the pressure brewing effect of the coffee maker to the coffee liquid.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

What is claimed is:

1. A coffee maker comprising:
a stator frame;
a grinding chamber, having
a cavity; and
a cover;
wherein the cavity is mounted on the stator frame, the cavity is covered by the cover to form a grinding cavity, a bottom of the grinding cavity is provided with a beverage outlet;
a grinding device, having
a grinding knife tackle, provided in the grinding cavity;
a motor, provided outside the grinding cavity and configured for driving the grinding knife tackle to rotate;
a coffee strainer, circularly arranged on a periphery of the grinding knife tackle; wherein, a lower part of the coffee strainer abutting a bottom wall of the grinding cavity is configured to separate the grinding cavity into a grinding bean cavity and a beverage cavity that is disposed around the periphery of the grinding bean cavity, the beverage outlet is communicated with the beverage cavity;
a hot water supply device, communicated with the grinding cavity and configured to supply hot water into the grinding bean cavity; and
a pressure space is formed in an upper part of the grinding bean cavity after the hot water is injected to reach a preset volume;
wherein the coffee strainer comprises a first strainer body, circularly arranged on a peripheral of the grinding knife tackle; and at least one second strainer body, arranged on a lower peripheral of the first strainer body; a lower end of the first strainer body and a lower end of the second strainer body abuts the bottom wall of the grinding cavity; the first strainer body and the second strainer body enclose a second filter chamber that is located between the grinding bean cavity and the beverage cavity.

2. The coffee maker of claim 1, wherein an upper part of the coffee strainer is sealed with the cavity, and the cavity is sealed with the cover.

3. The coffee maker of claim 2, wherein a second seal ring is provided between the upper part of the coffee strainer and an upper part of the cavity.

4. The coffee maker of claim 3, wherein a locating groove with a ring shape is provided on an outer surface of the upper part of the coffee strainer, configured to sleeve the second seal ring in the locating groove; and the second seal ring is partially extruded out of the locating groove and elastically abuts an inner surface of the upper part of the cavity.

5. The coffee maker of claim 2, wherein a third seal ring is provided between an inner end-surface of the cover and an upper end-surface of the cavity.

6. The coffee maker of claim 5, wherein a top surface of the coffee strainer is sealed with the cover.

7. The coffee maker of claim 6, wherein an upper part of the coffee strainer is radially sealed with the cover by using a first seal ring.

8. The coffee maker of claim 7, wherein the cover is provided with a column-shaped protrusion that protrudes into the upper part of the coffee strainer, the first seal ring is provided between an outer surface of the protrusion and an inner surface of the upper part of the coffee strainer.

9. The coffee maker of claim 8, wherein the first sealing ring comprises an annular-shaped sealing body extending along an axial direction of the grinding cavity, and an outer surface of the sealing body is provided with at least one annular-shape sealing bulge rib; the at least one sealing bulge rib elastically abuts the inner surface of the upper part of the coffee strainer.

10. The coffee maker of claim 9, wherein an upper part of the sealing body is provided with a limiting flange that extends outward along a radial direction of the grinding chamber; and an upper surface of the coffee strainer abuts the limiting flange.

11. The coffee maker of claim 7, wherein a second seal ring is provided between the upper part of the coffee strainer and an upper part of the cavity.

12. The coffee maker of claim 6, wherein a seal washer is provided between an inner end-surface of the cover and an upper end-surface of the cavity.

13. The coffee maker of claim 12, wherein an upper part of the cavity is provided with an annular-shaped step to lap the inner end-surface of the cover, the top surface of the coffee strainer is situated higher than or flush the annular-shaped step, the seal washer is disposed between the annular-shaped step and the inner surface of the cover.

14. The coffee maker of claim 13, wherein the cover is provided with a first water inlet, the hot water supply device is communicated with the grinding cavity by using the first water inlet.

15. The coffee maker of claim 14, wherein the first water inlet is provided on a lower end-surface of the cavity, an opening end of the cavity is provided with the annular-shaped step, radially extending outward, the annular-shaped step is provided with a second water inlet that is communicated with the hot water supply device and the first water inlet.

16. The coffee maker of claim 1, wherein the coffee strainer is an all-metal strainer.

17. The coffee maker of claim 16, wherein filtration holes of the all-metal strainer are provided on a middle part and/or a lower part of the all-metal strainer.

18. The coffee maker of claim 1, wherein the first and second strainer bodies of the coffee strainer define a strainer body, circularly arranged on the peripheral of the grinding knife tackle; and the coffee strainer further comprises a cylindrical fixed frame, a lower end of the cylindrical fixed frame is fixedly connected with an upper end of the strainer body along an axial direction; a lower end of the strainer body is a lower end of the coffee strainer, an upper part of the cylindrical fixed frame is an upper part of the coffee strainer.

19. The coffee maker of claim 18, wherein a material of the strainer body is metal, a material of the cylindrical fixed frame is plastic, and the cylindrical fixed frame is fixed to the strainer body by an injection molding.

20. The coffee maker of claim 18, wherein a bottom wall of the cavity is provided with a lug boss, the strainer body is sleeved on the lug boss that is configured to position the strainer body in the grinding cavity.

21. The coffee maker of claim 1, wherein the hot water supply device comprises a water tank, a water supply pipe that is connected with the water tank and the grinding chamber, a water pump and a heating pipe that are provided on the water supply pipe.

22. The coffee maker of claim 21, wherein the hot water supply device comprises a boiler, a water supply pipe that is connected with the boiler and the grinding chamber, and the water pump is provided on the water supply pipe.

23. The coffee maker of claim 22, wherein a temperature sensor is disposed in the boiler.

24. The coffee maker of claim 22, wherein the boiler and the cavity are situated abreast.

25. The coffee maker of claim 1, wherein the beverage outlet is provided with a liquid outlet valve.

26. The coffee maker of claim 25, wherein the liquid outlet valve comprises a valve body, and the upper part of the valve body is provided with a sealing strip, and the lower part of the valve body is provided with an annular-shaped lug boss, and an elastomeric member is provided between the annular-shaped lug boss and the lower end-surface of the beverage outlet.

27. The coffee maker of claim 1, wherein the cavity is detachably connected with the stator frame.

28. The coffee maker of claim 1, wherein an air pressure in the pressure space is greater than or equal to 1 bar, and less than or equal to 2 bar.

29. The coffee maker of claim 28, wherein an air pressure of the pressure space is in a range of 1.3 bar to 1.7 bar.

30. A coffee preparation method, wherein the coffee preparation method adopts a coffee maker to brew coffee, wherein the coffee maker comprises:
 a stator frame;
 a grinding chamber, having a cavity; and a cover; wherein the cavity is mounted on the stator frame, the cavity is covered by the cover to form a grinding cavity, a bottom of the grinding cavity is provided with a beverage outlet;
 a grinding device, having a grinding knife tackle, provided in the grinding cavity; and a motor, provided outside the grinding cavity and configured for driving the grinding knife tackle to rotate;
 a coffee strainer, circularly arranged on a periphery of the grinding knife tackle; wherein, a lower part of the coffee strainer abutting a bottom wall of the grinding cavity is configured to separate the grinding cavity into a grinding bean cavity and a beverage cavity around a periphery of the grinding bean cavity, a beverage outlet is communicated with the beverage cavity; and
 a hot water supply device, communicated with the grinding cavity;
 wherein the coffee strainer comprises a first strainer body, circularly arranged on a periphery of the grinding knife tackle; and at least one second strainer body, arranged on a lower peripheral of the first strainer body; a lower end of the first strainer body and a lower end of the second strainer body abuts the bottom wall of the grinding cavity; the first strainer body and the second strainer body enclose a second filter chamber that is located between the grinding bean cavity and the beverage cavity;
 the coffee preparation method comprises following steps:
 the grinding knife tackle is configured to grind coffee beans that are disposed into the grinding bean cavity to coffee powders; and
 the hot water supply device supplies hot water into the grinding bean cavity, after the hot water is injected to reach a preset volume, a pressure space is formed in an upper grinding bean cavity, configured to pressure brew coffee liquid in the grinding bean cavity.

31. The coffee preparation method of claim 30, wherein after the step that the hot water supply device supplies hot water into the grinding bean cavity:
 the hot water supply device injects air into the grinding bean cavity configured to increase or maintain an air pressure in the pressure space.

32. The coffee preparation method of claim 30, wherein an air pressure of the pressure space is in a range of 1.3 bar to 1.7 bar.

* * * * *

UNITED STATES PATENT AND TRADEMARK OFFICE
CERTIFICATE OF CORRECTION

PATENT NO. : 10,694,885 B2
APPLICATION NO. : 15/578712
DATED : June 30, 2020
INVENTOR(S) : Lizhong Ren et al.

Page 1 of 1

It is certified that error appears in the above-identified patent and that said Letters Patent is hereby corrected as shown below:

On the Title Page

At item (30) Foreign Application Priority Data should read:
Sep. 14, 2016 (CN)........201610825498.4
Sep. 14, 2016 (CN)........201610826055.7

Page 2 at item (30) Foreign Application Priority Data should read:
Sep. 14, 2016 (CN)........201621057724.0
Sep. 14, 2016 (CN)........201621058049.3

Signed and Sealed this
Ninth Day of March, 2021

Drew Hirshfeld
*Performing the Functions and Duties of the
Under Secretary of Commerce for Intellectual Property and
Director of the United States Patent and Trademark Office*